United States Patent Office 3,084,184
Patented Apr. 2, 1963

3,084,184
CARBAMIC ACID ESTERS OF PHENOLS
Arnold Hausweiler and Klaus Schwarzer, Koln-Flittard, Günter Unterstenhöfer, Opladen, and Wolfgang Behrenz, Wuppertal-Elberfeld, Germany, assignors to Farbenfabriken Bayer Aktiengesellschaft, Leverkusen, Germany, a corporation of Germany
No Drawing. Filed Feb. 10, 1961, Ser. No. 88,311
Claims priority, application Germany Feb. 13, 1960
3 Claims. (Cl. 260—479)

The present invention relates to and has as its objects new and useful insecticidal compounds and processes for their production. Generally the new compounds of this invention are carbamic acid derivatives of the following formula:

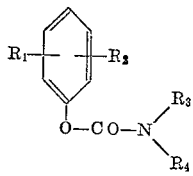

in which $R_1$ stands for a cyclopentyl or cyclopentenyl radical, $R_2$ stands for hydrogen or a lower alkyl radical, $R_3$ and $R_4$ stand for hydrogen or lower alkyl radicals at least one of them being a lower alkyl radical.

For combating insects which damage plants, besides the large group of organic phosphorus compounds and chlorinated hydrocarbons, carbamates of naphthols and phenols have recently become of importance to an increasing degree.

It is known that the N-mono- and N,N-dimethyl-carbamates of naphthols possess an insecticidal activity while relatively non-toxic to warm blooded animals (cf. Contribution from Boyce Thomson Institute, volume 18, No. 11, 1957, and Deutsche Auslegeschrift 1,037,195.

It is further known that carbamates of phenol and of a few substituted phenols possess a good insecticidal action especially against house flies and that such compounds, in admixture with other insecticides, show sometimes a synergistic effect, Deutsches Bundespatent 956,638, Deutsches Bundespatent 612,124 and Deutsches Bundespatent 964,818.

In accordance with the present invention it has now been found that N-mono- and N,N-dimethyl carbamates of cyclopentenyl- and cyclopentyl phenols possess a surprisingly good action against a large number of insects which damage plants and animals, equal to and in some cases exceeding the action of e.g. commercial products such as α-naphthyl-N-methyl carbamate.

It is surprising that the carbamates of substituted, especially cycloalkyl substituted, phenols reached such an outstanding action against caterpillars, plant lice, shield lice and fruit flies. It was further especially surprising that the same carbamates could be used for combating ectoparasites of domestic animals.

Of the carbamates only the aforementioned α-naphthyl N-methylcarbamate has been hitherto known for combating ectoparasites of domestic animals. However, this compound acts only relatively weakly against pests of this kind, e.g. against ticks extensively spread on domestic animals in the tropics or sub-tropics. It was therefore striking that the compounds obtainable according to the invention are effective more quickly and at lower concentrations than α-naphthyl-N-methyl carbamate, with no greater toxicity to mammals.

In order to achieve a rapid as well as a persistent activity against repeated infestation of ectoparasites, the new carbamates can also be applied in combination with other preparations, which possess no such rapid action but have a persistent effect.

As compounds according to the invention there come into consideration in the first instance the N-methyl and N,N-dimethyl carbamates of phenols which contain a cyclopentenyl or cyclopentyl radical in the o- or p-position and also one or more alkyl, alkoxy and/or halogen substituents.

The production of the cycloalkyl substituted phenols is carried out in a manner known as such by reaction of phenols or substituted phenols with e.g. cyclopentenyl chloride in the presence of alkali to give the corresponding cyclopentenyl phenols, which can be transformed by catalytic hydrogenation into cyclopentyl phenols, or by condensation of cyclopentadiene with phenols in the presence of bleaching earths into cyclopentenyl phenols which by catalytic hydrogenation give cyclopentyl phenols.

These phenols are reacted to form the carbamates in known manner, e.g. by reaction of the corresponding halocarbonic acid esters with mono- or dimethyl-amine or from the phenols and mono- or dimethyl-carbamic acid halides in the presence of alkali or by reaction of the phenols with corresponding isocyanates.

The following examples are given for the purpose of illustrating the invention.

Example 1

40 g. of o-cyclopentyl phenol are treated slowly in 100 ml. toluene, after addition of 1 g. of trimethylamine, with 27 g. of N-methyl carbamic acid chloride with stirring at 110–120° C. As soon as the hydrogen chloride evolution has ended it is cooled, washed with water and the solvent evaporated off. There remains the o-cyclopentyl-phenyl-N-methylcarbamate in crystalline form. Melting point 91° C. (from Ligroin).

Example 2

25 g. of phosgene are dissolved in 150 ml. toluene. Into this solution there is stirred with cooling a suspension of 45 g. o-cyclopentenyl phenol sodium salt. As soon as the exothermic reaction has ended, methyl amine is introduced in excess at 30° C. followed by washing with water to obtain, after evaporation of the solvent, the o-cyclopentenyl-phenyl-N-methylcarbamate in solid form.

Example 3

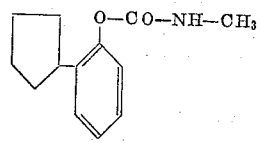

o-Cyclopentyl phenyl-N-methylcarbamate is brought into a sprayable form with the aid of equal parts by weight of dimethyl formamide and benzyl hydroxy diphenyl polyglycol ether (emulsifier) and subsequent dilution with water to the concentrations given in the table.

(a) Test on *Plutella maculipennis*: Cabbage leaves, which were infested with diamond back moth (*Plutella maculipennis*) were then sprayed with the aqueous emulsions at various concentrations until drip wet.

| Percent active emulsion ($H_2O$): | Percent dead caterpillars after 4 days |
|---|---|
| 0.1 | 100 |
| 0.02 | 100 |
| 0.004 | 30 |
| 0.0008 | 10 |

(b) Test on black bean aphid (*Doralis fabae*): Thick bean shoots were sprayed with the same compound in the same way after infestation with *Doralis Fabae*.

Percent active emulsion (H₂O): | Percent dead after 48 hours
---|---
0.1 | 100
0.02 | 100
0.004 | 100
0.0008 | 0

(c) Test on *Pseudococcus maritimus*: Potato tubers, which were infested with *Pseudococcus maritimus* were then sprayed with the aqueous emulsions at 0.1% concentration until drip-wet.

Percent active emulsion (H₂O): | Percent dead after 8 days
---|---
0.1 | 100

Example 4

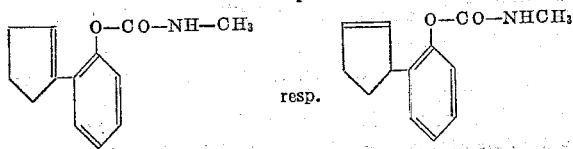

resp.

o - Cyclopentenylphenyl - N - methylcarbamate was brought into a form capable of spraying with the assistance of equal parts by weight of dimethyl formamide and benzyl hydroxy diphenyl polyglycol ether (emulsifier) as described in the preceding example.

(a) Test on *Plutella maculipennis*: Cabbage leaves infested with diamond back moth (*Plutella maculipennis*) were then sprayed with the aqueous emulsion of various concentrations until drip-wet.

Percent active emulsion (H₂O) (see above): | Percent dead caterpillars after 4 days
---|---
0.1 | 100
0.02 | 100
0.004 | 20

(b) Test on black bean aphid (*Doralis fabae*): Thick bean shoots which were infested with *Doralis fabae*, were sprayed with the same compound and in the same way.

Percent active emulsion (H₂O) (see above): | Percent dead after 48 hours
---|---
0.1 | 100
0.02 | 100
0.004 | 80

(c) Test on *Pseudococcus martimus*: Potato tubers which were infested with *Pseudococcus maritimus* were then sprayed with the aqueous emulsion at 0.1% concentration until drip-wet.

Percent active emulsion (H₂O) (see above): | Percent dead after 8 days
---|---
0.1 | 60

Example 5

A bull which was infected over the whole body with ticks of the type *Boophilus microplus* in various stages of development were sprayed with o-cyclopentyl-phenyl-N-methyl carbamate in the form of an aqueous 0.1% active suspension (see foregoing examples). A further bull which was likewise infected with the same type of tick was sprayed with a 0.05% active suspension. The ticks began to die one hour after treatment and were dead to 100% two hours after treatment. In comparative experiments α-naphthyl-N-methyl carbamate only began to act after two hours and did not kill the ticks to 100% even at 0.1% concentration after 24 hours.

Example 6

Fully developed adult female ticks of the type *Boophilus microplus* were dipped for 1 minute into 1-cyclopentenylphenyl-N-methyl carbamate and in α-naphthyl-N-methylcarbamate at various concentrations. 5 hours after treatment the following killing results were determined:

| Preparation | Percent Active substance (aqueous emulsion) | Percent killed |
|---|---|---|
| 2-cyclopentenyl-phenyl-N-methyl-carbamate | 0.3 | 100 |
| | 0.15 | 100 |
| | 0.1 | 100 |
| | 0.05 | 90 |
| | 0.025 | 70 |
| 2 - cyclopentenyl - phenyl - N,N - dimethyl - carbamate | 0.3 | 100 |
| | 0.15 | 80 |
| 2 - cyclopentyl - 5 - methyl - phenyl - N - merhyl-carbamate | 0.3 | 100 |
| | 0.1 | 80 |
| α-naphthyl-N-methylcarbamate | 0.3 | 100 |
| | 0.15 | 80 |
| | 0.1 | 60 |
| | 0.05 | 60 |
| | 0.025 | 20 |

Example 7

To show the activity of the inventive compounds against endo-parasites, sheep infested with *Haemonchus cont.* have been treated with emulsions of o-cyclopentyl-phenyl-N-methyl-carbamate and α-naphthyl - N - methyl-carbamate, prepared as described above. The results are to be seen from the following table:

| Preparation | No. of sheep treated | Wound infested with— | Active ingredient in mg./kg. | Activity in Percent |
|---|---|---|---|---|
| o-cyclopentyl-phenyl-N-methyl carbamate | 1 | *Haemonchus cont.* | 50 | 100 |
| | 1 | do | 50 | 100 |
| | 1 | do | 50 | 95 |
| | 1 | do | 20 | 46 |
| α-naphtyl-N-methyl-carbamate | 1 | do | 50 | 75 |
| | 1 | do | 20 | 13 |

We claim:
1. A compound of the following formula

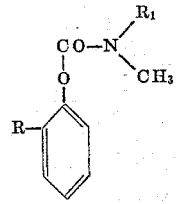

in which R stands for a member selected from the group consisting of a cyclopentyl and cyclopententyl radical and R₁ stands for a member selected from a group consisting of hydrogen and methyl.

2. The compound of the formula

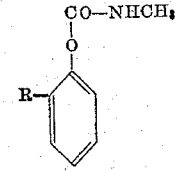

in which R stands for a cyclopentyl radical.

3. The compound of the formula

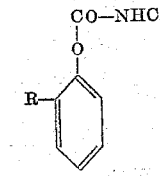

in which R stands for a cyclopentenyl radical.

References Cited in the file of this patent
UNITED STATES PATENTS 2,776,197 Gysin et al. Jan. 1, 1957
2,903,478 Lambrech Sept. 8, 1959